United States Patent
Bishop

(10) Patent No.: US 7,082,022 B2
(45) Date of Patent: Jul. 25, 2006

(54) CIRCUIT FOR DIVERTING SURGES AND TRANSIENT IMPULSES

(75) Inventor: Roger Bishop, Dayton, NV (US)

(73) Assignee: PolyPhaser Corporation, Minden, NV (US)

( * ) Notice: Subject to any disclaimer, the term of this patent is extended or adjusted under 35 U.S.C. 154(b) by 0 days.

(21) Appl. No.: 10/452,094

(22) Filed: May 30, 2003
(Under 37 CFR 1.47)

(65) Prior Publication Data

US 2005/0259376 A1    Nov. 24, 2005

Related U.S. Application Data

(60) Provisional application No. 60/384,886, filed on May 31, 2002.

(51) Int. Cl.
*H02H 1/00* (2006.01)

(52) U.S. Cl. .................................................. 361/119

(58) Field of Classification Search ................. 361/56, 361/119
See application file for complete search history.

(56) References Cited

U.S. PATENT DOCUMENTS

| | | | | |
|---|---|---|---|---|
| 3,619,721 A | * | 11/1971 | Westendorp | 361/16 |
| 3,731,234 A | * | 5/1973 | Collins | 333/1 |
| 3,944,937 A | * | 3/1976 | Fujisawa et al. | 333/178 |
| 4,112,395 A | * | 9/1978 | Seward | 333/17.3 |
| 4,481,641 A | * | 11/1984 | Gable et al. | 375/220 |
| 5,124,873 A | | 6/1992 | Wheeler et al. | 361/111 |
| 5,142,429 A | * | 8/1992 | Jaki | 361/56 |
| 5,353,189 A | * | 10/1994 | Tomlinson | 361/118 |
| 5,617,284 A | * | 4/1997 | Paradise | 361/58 |
| 5,953,195 A | | 9/1999 | Pagliuca | 361/120 |
| 5,966,283 A | * | 10/1999 | Glaser et al. | 361/119 |
| 6,141,194 A | * | 10/2000 | Maier | 361/58 |
| 6,177,849 B1 | * | 1/2001 | Barsellotti et al. | 333/177 |
| 6,252,755 B1 | * | 6/2001 | Willer | 361/119 |
| 6,342,998 B1 | | 1/2002 | Bencivenga et al. | 361/119 |
| 6,385,030 B1 | | 5/2002 | Beene | 361/119 |
| 6,421,220 B1 | | 7/2002 | Kobsa | 361/120 |
| 2004/0264087 A1 | * | 12/2004 | Bishop | 361/91.1 |

OTHER PUBLICATIONS

Notification of Transmittal of the International Search Report, International Search Report, PCT/US03/17050, dated Mar. 10, 2004.

* cited by examiner

*Primary Examiner*—Ronald Leja
(74) *Attorney, Agent, or Firm*—Snell & Wilmer LLP

(57) ABSTRACT

A circuit for attenuating a surge is disclosed that might include a conductor for receiving the surge, a capacitor, positioned along the conductor, for blocking the surge, and a gas tube having a first end coupled to the conductor and a second end coupled to a ground. The circuit might also include a transformer having a first wire and a second wire, the transformer being coupled to the conductor, a resistor coupled to the first and second wires of the transformer, a varistor coupled to the first wire of the transformer, and a diode coupled to the second wire of the transformer.

20 Claims, 1 Drawing Sheet

Figure 2 is a schematic diagram of a circuit for attenuating transient impulses according to one embodiment of the present invention.

CIRCUIT FOR DIVERTING SURGES AND TRANSIENT IMPULSES

CROSS-REFERENCE TO RELATED APPLICATION

This application relates to and claims priority from U.S. Provisional Patent Application Ser. No. 60/384,886, filed May 31, 2002, entitled "CIRCUIT FOR ATTENUATING TRANSIENT IMPULSES," which is herein incorporated by reference for all purposes.

BACKGROUND OF THE INVENTION

1. Field of the Invention

The present invention relates generally to the field of electronic circuits for surge suppression, and more particularly to a circuit for diverting surges and transient impulses away from sensitive electronic equipment.

2. Description of the Related Art

Surge suppression circuits can be used to protect electronic equipment from voltage surges caused by lightning strikes, switching surges, transients, noise, incorrect connections, and other abnormal conditions or malfunctions. The electronic equipment is extremely susceptible to damage and destruction by very short duration transient voltage spikes. For example, these transient voltage spikes can have durations of about 28 microseconds, peak voltages of about 6,000 volts and peak follow currents of about 3,000 amperes. Even though these transient voltage spikes are generally of short duration, the ultimate effect can result in severe damage to the electronic equipment.

One example of a surge suppression circuit for providing transient voltage surge suppression is shown schematically in FIG. 1. The surge suppression circuit 100 includes a gas tube 102 connected across a signal conductor 104 and a shield conductor 106 of a coaxial cable 108. The shield conductor 106 is coupled directly to ground. If the voltage across the signal conductor 104 exceeds a predetermined level, the gas in the gas tube 102 is ionized, permitting current to flow between the two electrodes inside the gas tube 102. Therefore, when a voltage surge across the signal conductor 104 exceeds the level at which the ionized gas current pathway forms, the voltage is clamped at the ionization voltage of the gas tube 102. During normal operation, the surge suppression circuit 100 passes dc signals, low frequency signals and high frequency signals. During a surge condition, the leading portion of the voltage surge can pass to the electronic equipment because the gas tube 102 does not fire until after the leading portion has traveled past the gas tube 102. Therefore, the gas tube 102 is unable to divert the leading portion of the surge.

One drawback of the surge suppression circuit 100 is its inability to divert the leading portion of the surge, while passing direct current, high frequency rf signals and low frequency signals.

SUMMARY OF THE INVENTION

By way of example, one embodiment of the present invention is a circuit for attenuating a surge. The circuit might include a conductor for receiving the surge, a capacitor, positioned along the conductor, for blocking the surge, and a gas tube having a first end coupled to the conductor and a second end coupled to a ground. The circuit might also include a transformer having a first wire and a second wire, the transformer being coupled to the conductor, a resistor coupled to the first and second wires of the transformer, a varistor coupled to the first wire of the transformer, and a diode coupled to the second wire of the transformer.

Another embodiment of the present invention is a surge suppression circuit having an input conductor for coupling to a signal line and an output conductor for coupling to equipment to be protected. The circuit might include a capacitor coupled between the input conductor and the output conductor, and a transformer having a first conductor coupled to the input conductor and a second conductor coupled to the output conductor.

Another embodiment of the present invention is a circuit for attenuating transient impulses that might include an input port configured to receive a signal and a transient impulse having a leading portion and a trailing portion, a gas tube coupled to the input port and configured to discharge the trailing portion of the transient impulse, and a capacitor coupled to the input port and configured to pass the signal and block the leading portion of the transient impulse. The circuit might also include a transformer coupled to the input port and configured to pass the signal and the leading portion of the transient impulse, a varistor coupled to the transformer and configured to discharge most of the leading portion of the transient impulse, a resistor coupled to the transformer, and a diode coupled to the transformer.

Several advantages of the surge suppression circuit include extended bandwidth, reduced let-through voltage and energy, multi-channel operation and circuit board implementation for reduced size. Other advantages will be apparent to those skilled in the art.

For purposes of summarizing the present invention, certain aspects, advantages, and novel features of the present invention have been described herein. Of course, it is understood that not necessarily all such aspects, advantages or features will be embodied in any one particular embodiment of the present invention.

DETAILED DESCRIPTION OF THE PRESENTLY PREFERRED EMBODIMENTS

A circuit that implements the various features of the present invention will now be described with reference to the drawings. The drawings and the associated descriptions are provided to illustrate embodiments of the present invention and not to limit the scope of the present invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Figure 1:
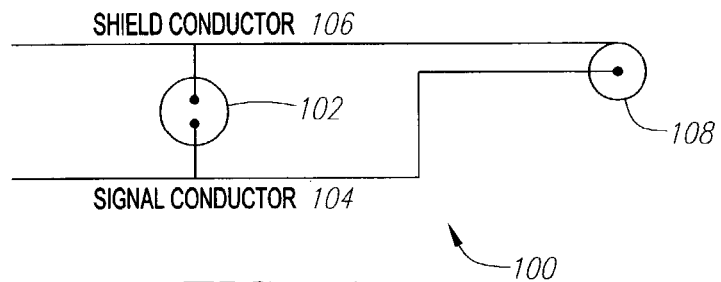
FIG. 1 is a schematic circuit diagram illustrating a prior art surge suppression circuit.
Figure 2:
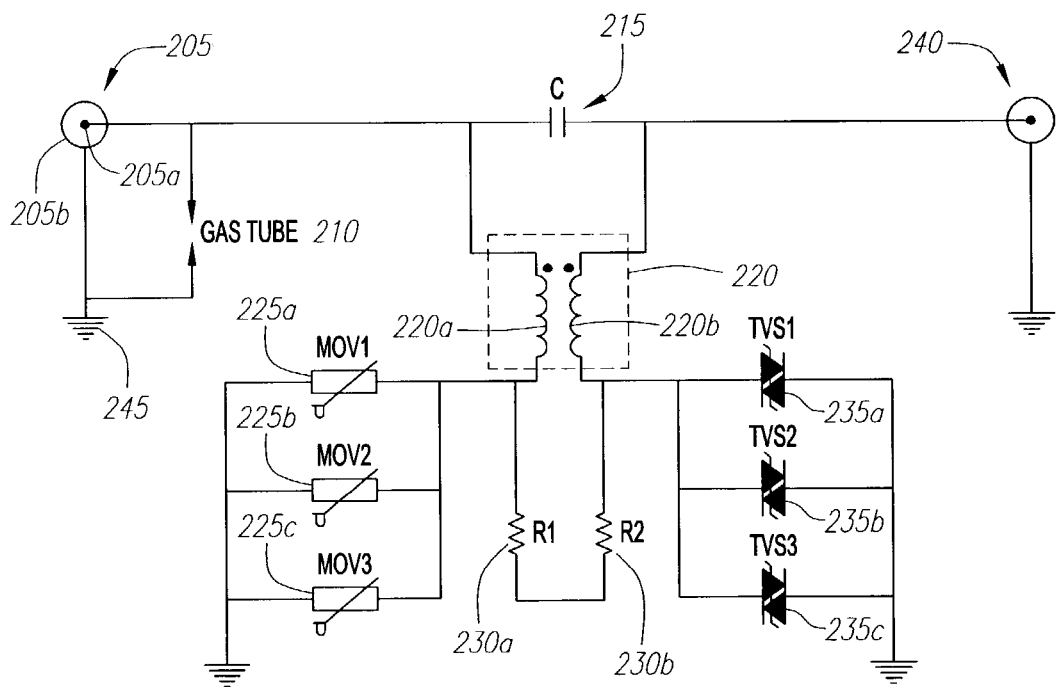
FIG. 2 is a schematic diagram of a circuit for attenuating transient impulses according to one embodiment of the present invention.

Referring now more particularly to the drawings, FIG. 2 is a schematic diagram of a circuit 200 for attenuating surges and transient impulses. The circuit 200 can be used with a coaxial system or other electrical or telecommunications system. The circuit 200 can include an input port 205, a gas tube 210, a capacitor 215, a transformer 220, a plurality of varistors 225, a plurality of resistors 230, a plurality of diodes 235, and an output port 240. Preferably, the input port 205 is coupled to a signal line (e.g., a coaxial cable) and the output port 240 is coupled to the electronic components or equipment to be protected. The operating frequency range of the circuit 200 is typically dc to about 3.0 GHz.

The input port 205 can include an inner conductor 205a configured to receive a modulated radio-frequency (rf) signal and a direct current and an outer conductor 205b coupled to a ground terminal 245. The input port 205 can receive an audio signal or any other type of signal and can be coupled to the signal line via a connector (not shown). The signal line can propagate the signal and the direct current. The inner conductor 205a of the input port 205 can be coupled to the gas tube 210 and the capacitor 215. For example, a first end of the gas tube 210 can be coupled to the inner conductor 205a and a second end of the gas tube 210 can be coupled to the outer conductor 205b and the ground terminal 245. In one embodiment, the gas tube 210 is a three-element gas tube that has a turn-on voltage of about 75 volts and a clamping voltage of about 250 volts.

A first plate of the capacitor 215 can be coupled to the input port 205 (i.e., the inner conductor 205a) and a second plate of the capacitor 215 can be coupled to the output port 240. The capacitor 215 can pass high-frequency rf signals in the range of about 200 MHz and up from the input port 205 to the output port 240 and block the direct current and transient impulse energy from directly coupling from the input port 205 to the output port 240. In one embodiment, the capacitor 215 has a capacitance of about 39 pico Farads. The capacitor 215 can attenuate frequencies at a rate of about 6 dB per octave below about 100 MHz. In one embodiment, the capacitor 215 passes rf signals that have a frequency in the range of about 1 GHz to about 3 GHz.

The transformer 220 can have a solid ferrite toroid core and two enamel coated wires 220a, 220b wound around the core in a common mode configuration. The wires 220a, 220b can also be coils, conductors, windings or any other device capable of carrying a current and/or voltage. The number of windings, size, shape and material of the core of the transformer 220 are selected to pass the direct current and the low frequency signals and block the high frequency signals. In one embodiment, the core has a diameter of about 5 millimeters, has a toroid shape and is made of a ferrite material. One end of the first wire 220a is coupled to the capacitor 215 and the other end of the first wire 220a is coupled to the plurality of varistors 225 and the resistor 230a. One end of the second wire 220b is coupled to the opposite end of the capacitor 215 and the other end of the second wire 220b is coupled to the resistor 230b and the plurality of diodes 235. The output port 240 is coupled to the transformer 220 and to a signal line (not shown) via a connector (not shown).

The transformer 220 can operate in a normal mode or a saturation mode. During the normal mode of operation, the transformer 220 passes the direct current and the low-frequency signals and the capacitor 215 passes the high-frequency rf signals. The two wires 220a, 220b carry the direct current and allow the direct current to travel across the transformer 220 without saturating the core of the transformer 220. The transformer 220 allows the direct current to pass and low-frequency signals in the range of about 50 kHz to about 100 MHz to couple, with low loss characteristics, between the input port 205 and the output port 240. That is, the direct current passes from the input port 205 to the output port 240 by traveling through the wire 220a, the resistors 230, and the wire 220b. The low-frequency signals are coupled from the input port 205 to the output port 240 via the transformer 220. The transformer 220 appears as a high impedance circuit to (i.e., blocks) the high-frequency rf signals. During the normal mode of operation, the transformer 220 operates as a linear device, which allows for a much wider usable frequency range (i.e., an increased bandwidth of dc to about 3 GHz). In addition, the transformer 220 provides a low impedance path for at least a portion of the transient impulse energy to pass through to the plurality of varistors 225 and the plurality of diodes 235. Hence, the transformer 220 passes low-frequency signals while maintaining a high inductance and a high level of coupling.

During a surge condition, such as a lightning strike, a transient impulse travels along the coaxial cable to the input port 205. Most of the transient impulse is present at frequencies of about 10 kHz to about 50 kHz. From the input port 205, the leading portion of the transient impulse typically travels past the gas tube 210 due to the turn on time delay of the gas tube 210. Once the gas tube 210 turns on, the trailing portion of the transient impulse is diverted through the gas tube 210 to the ground terminal 245. The capacitor 215 blocks the leading portion of the transient impulse and diverts it to the transformer 220. The leading portion of the transient impulse travels across the transformer 220 and to the plurality of varistors 225. At approximately this time, the core of the transformer 220 may saturate causing the inductance of the wire 220a to decrease, which prevents or minimizes the transient impulse from coupling to the wire 220b. That is, as the surge current builds in the wire 220a, the core of the transformer 220 saturates, thus decoupling the wire 220a from the wire 220b so that minimal to no coupling occurs between the wire 220a and the wire 220b during the saturation mode. Hence, the transient impulse can travel along the wire 220a but is prevented from coupling to the wire 220b due to the saturated core.

Once the desired turn on voltage of the plurality of diodes 235 is reached, the initial part of the leading portion of the transient impulse is diverted by the plurality of diodes 235 to ground. As the surge current increases, sufficient voltage is developed across the resistors 230 to turn on the plurality of varistors 225. Only a small portion of the remaining energy from the transient impulse may travel to the wire 220b and then to the output port 240.

Each of the plurality of varistors 225 can have a turn-on voltage of about 58 volts and a clamping voltage of about 75 volts. FIG. 2 shows three varistors 225 in parallel, however, one or more varistors 225 can be used. Each varistor 225 has a current handling capability of up to about 600 amperes. In one embodiment, each varistor 225 is a metal oxide varistor (MOV). After enough voltage develops across the resistors 230, the varistors 225 turn on to divert a portion of the transient impulse to ground.

Each of the plurality of resistors 230 has a resistance of about 0.1 ohms. FIG. 2 shows two resistors 230a, 230b in series, however, one or more resistors 230 can be used. Each resistor 230 has a power handling capability of up to about 1 watt. Preferably, the first resistor 230a is coupled to the first wire 220a and the second resistor 230b is coupled to the second wire 220b. The resistors 230 are used to allow the varistors 225 to turn on before the diodes 235 burn out from the surge.

Each of the plurality of diodes 235 can have a turn-on voltage of about 28 volts and a clamping voltage of about 35 volts. FIG. 2 shows three diodes 235 in parallel, however, one or more diodes 235 can be used. Each diode 235 has a power handling capability of up to about 1,500 watts. In one embodiment, each diode 235 is a transient voltage surge (TVS) diode. The diodes 235 preferably turn on before the varistors 225, which preferably turn on before the gas tube 210.

Although an exemplary embodiment of the invention has been shown and described, many other changes, combinations, omissions, modifications and substitutions, in addition to those set forth in the above paragraphs, may be made by one having ordinary skill in the art without necessarily departing from the spirit and scope of this invention. Accordingly, the present invention is not intended to be limited by the preferred embodiments, but is to be defined by reference to the appended claims.

What is claimed is:

1. A circuit for attenuating a surge comprising:
   an input conductor for receiving a signal and a surge induced overcurrent;
   an output conductor for receiving the signal;
   a capacitor, connected between the input and output conductors, for blocking the surge;
   a gas tube having a first end connected to the input conductor and a second end connected to a ground;
   a transformer in parallel with the capacitor, the transformer having a core and first and second wires wound around the core, the first wire of the transformer connected to the input conductor, the second wire of the transformer connected to the output conductor and the core saturating when the surge induced overcurrent reaches the first wire; and
   a resistor connecting the first and second wires of the transformer.

2. The circuit of claim 1, further comprising a diode connected to the second wire for diverting a first portion of the surge induced current to ground.

3. The circuit of claim 2, further comprising a varistor connected to the first wire for diverting a second portion of the surge induced current to ground.

4. The circuit of claim 3, wherein the varistor is a metal oxide varistor and the diode is a transient voltage surge diode.

5. The circuit of claim 1, wherein the core is a ferrite toroid core.

6. A surge suppression circuit having an input conductor for coupling to a signal line and an output conductor for coupling to equipment to be protected, the circuit comprising:
   a capacitor having a first conductor connected to the input conductor and a second conductor connected to the output conductor; and
   a transformer having a primary winding connected to the first conductor of the capacitor and a secondary winding connected to the second conductor of the capacitor.

7. The circuit of claim 6, wherein the transformer has a core that has a toroid configuration and is made of a ferrite material.

8. The circuit of claim 7, wherein the first and second conductors are wrapped around the core.

9. The circuit of claim 6, wherein:
   the input conductor is configured to receive a direct current, a low frequency signal, a high-frequency signal and a surge;
   the capacitor is configured to pass the high-frequency signal and block the direct current, the low-frequency signal and the surge; and
   the transformer is configured to pass the direct current and to couple the low-frequency signal to the output conductor.

10. The circuit of claim 6, further comprising a gas tube, coupled to the input conductor, for diverting a portion of a surge to ground.

11. The circuit of claim 6, further comprising a metal oxide varistor, coupled to the transformer, for diverting a portion of a surge to ground.

12. The circuit of claim 6, further comprising a diode, coupled to the transformer, for diverting a portion of a surge to a ground.

13. The circuit of claim 12, further comprising a resistor, coupled to the transformer, for protecting the diode.

14. A circuit for attenuating transient impulses comprising:
   an input port configured to receive a signal and a transient impulse having a leading portion and a trailing portion;
   a gas tube directly connected to the input port and configured to divert the trailing portion of the transient impulse to ground;
   a capacitor directly connected to the input port and configured to pass the signal and block the leading portion of the transient impulse;
   a transformer directly connected to the input port and configured to pass the signal and the leading portion of the transient impulse; and
   a varistor directly connected to the transformer and configured to divert a part of the leading portion of the transient impulse to ground.

15. The circuit of claim 14, further comprising a diode, coupled to the transformer, for diverting a part of the leading portion of the transient impulse to ground.

16. The circuit of claim 15, further comprising a resistor, coupled to the transformer, for protecting the diode.

17. The circuit of claim 15, wherein the diode is turned on before the varistor, which is turned on before the gas tube.

18. The circuit of claim 14, wherein the transformer has a core and first and second wire wound around the core.

19. The circuit of claim 18, wherein the core has a toroid configuration and is made of a ferrite material.

20. The circuit of claim 14, wherein the varistor is a metal oxide varistor.

* * * * *